(12) United States Patent
Liu

(10) Patent No.: US 9,778,969 B2
(45) Date of Patent: Oct. 3, 2017

(54) AUTOMATIC MEMORY LEAK DETECTION

(71) Applicant: Yingqiao Liu, Shanghai (CN)

(72) Inventor: Yingqiao Liu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/316,820

(22) Filed: Jun. 27, 2014

(65) Prior Publication Data
US 2015/0378799 A1 Dec. 31, 2015

(51) Int. Cl.
G06F 9/44 (2006.01)
G06F 11/07 (2006.01)
G06F 11/36 (2006.01)

(52) U.S. Cl.
CPC .......... *G06F 11/073* (2013.01); *G06F 11/076* (2013.01); *G06F 11/3636* (2013.01); *G06F 11/3688* (2013.01)

(58) Field of Classification Search
CPC .................................................. G06F 11/3688
USPC ....................................................... 717/127
See application file for complete search history.

(56) References Cited

U.S. PATENT DOCUMENTS

| 7,434,206 | B2 * | 10/2008 | Seidman et al. | 717/124 |
| 7,827,538 | B2 * | 11/2010 | Trotter | 717/127 |
| 7,991,961 | B1 * | 8/2011 | Tsai et al. | 711/132 |
| 2006/0277440 | A1 * | 12/2006 | Minshall et al. | 714/38 |
| 2011/0138367 | A1 * | 6/2011 | Havin | 717/130 |
| 2013/0054923 | A1 * | 2/2013 | Bradley | G06F 11/3636 711/170 |
| 2013/0054925 | A1 | 2/2013 | Hsia | |

FOREIGN PATENT DOCUMENTS

WO 9303435 A1 2/1993

OTHER PUBLICATIONS

Jose Ferreira de Souza Filho;"Hunting Memory Leaks in Java"; Toptal website (Toptal.com) as captured by the Wayback Machine Internet Archive (archive.org) Sep. 26, 2013.*
Alex Allain; "Using Valgrind to Find Memory Leaks and Invalid Memory Use"; C Programming.com website (www.cprogramming.com) as captured by the Wayback Machine Internet Archive (archive.org) May 30, 2014.*
Steve Hanov; "Detecting C++ Memory Leaks"; Steve Hanov's Blog website (stevehanov.ca); Jan. 3, 2008.*

(Continued)

Primary Examiner — Qing Chen
Assistant Examiner — Clint Thatcher
(74) Attorney, Agent, or Firm — Richardt Patentanwalte

(57) ABSTRACT

A method comprises: executing an executable code by a computer processor; repetitively executing at least a portion of the executable code comprising dynamic memory allocation requests and dynamic memory deallocation requests, wherein a repetition number of the repetitive executions is an integer value greater than one; in response to execution of each of the dynamic memory allocation requests generating a record, each of the records comprising a unique memory identification of the main memory dynamically allocated upon the execution of the each of the dynamic memory allocation requests and a unique code identification of a fragment of the executable code and/or of a fragment of a source code corresponding to the fragment of the executable code.

15 Claims, 5 Drawing Sheets

(56) References Cited

OTHER PUBLICATIONS

European Search Report with regard to family application EP 14 174 765.9 completed on Dec. 10, 2014 and dated Dec. 19, 2014.
Hastings, R. et al.: "Purify: Fast Detection of Memory Leaks and Access Errors", Proceedings of the Winter USENIX Conference, XX, XX, Jan. 20, 1992, pp. 125-136.

* cited by examiner

Table 1

| Rec. nr. | Memory size | Address | Callstack0 | Callstack1 | ... | CallstackN |
|---|---|---|---|---|---|---|
| 1 | 200 | 0x0000000000378ec0 | subroute.cpp; 100 | Main.cpp; 50 | | |
| 2 | 300 | 0x0000000000378ea0 | subroute.cpp; 200 | Main.cpp; 50 | | |
| 3 | 400 | 0x0000000000388ec0 | subroute.cpp; 300 | Main.cpp; 50 | | |

Table 2

| Rec. nr. | Memory size | Address | Callstack0 | Callstack1 | ... | CallstackN |
|---|---|---|---|---|---|---|
| 1 | 200 | 0x0000000000378ec0 | subroute.cpp; 100 | Main.cpp; 50 | | |
| 3 | 400 | 0x0000000000388ec0 | Subroute.cpp; 300 | Main.cpp; 50 | | |
| 5 | 400 | 0x0000000000391ec0 | Subroute.cpp; 300 | Main.cpp; 50 | | |
| 6 | 300 | 0x0000000000390ec0 | Subroute.cpp; 200 | Main.cpp; 50 | | |
| 7 | 400 | 0x0000000000393ec0 | Subroute.cpp; 300 | Main.cpp; 50 | | |

Table 3

| Group nr. | Memory size | Callstack0 | Callstack1 | Count |
|---|---|---|---|---|
| 1 | 200 | subroute.cpp; 100 | Main.cpp; 50 | 1 |
| 2 | 300 | Subroute.cpp; 200 | Main.cpp; 50 | 1 |
| 3 | 400 | Subroute.cpp; 300 | Main.cpp; 50 | 3 |

Fig. 8

AUTOMATIC MEMORY LEAK DETECTION

BACKGROUND OF THE DISCLOSURE

Field of the Disclosure

Apparatuses and methods consistent with the exemplary embodiments relate to an electronic apparatus and method controlling the same, and more particularly to detecting a memory leak when executing an executable code.

Description of the Related Art

Executable codes being executed on computer systems often comprise dynamic memory allocation requests and dynamic memory deallocation requests. It is a common practice to prepare the executable code in a way that portions of the dynamic memory requested/allocated by executing of the dynamic memory allocation requests of said executable code are freed by executing of the respective dynamic memory allocation requests of said executable code. If the executable code fails to release the allocated dynamic memory before its execution is completed then it causes a memory leak, i.e. one or more portions of the dynamic memory remain allocated for the executable code after completion of the execution of the executable code. A special garbage collection software or service may free said not released dynamic memory after the completion of the execution of said executable code and thus compensate for said failures occurred during execution of said executable code. In the simplest case the user may simply reboot the computer in order to free all not deallocated portions of the dynamic memory. All these solutions may be at least partially effective, when the executable code is operated for a short time (i.e. no 24/7 continuous round-the-clock operation is required) and the ever increasing volume of the dynamic memory allocated for the execution of said executable code does not compromise operation of other executable codes executed on the same computer system and/or performance of the computer system itself. An ultimate solution would be to prepare an executable code upfront which is free of the aforementioned failures. This solution might be implemented when the executable code and/or source code used for generation of the executable code are relatively small, so that a software engineer is capable of finding all mistakes in at least one of said codes just by checking at least one of said codes and/or by executing the executable code in a debug mode. If the executable code is big, which is typically the case for modern industrial/commercial software, then there is a need for an automated system for memory leak detection.

SUMMARY OF THE PRESENT DISCLOSURE

A main memory is, as understood here, a memory directly accessible to the central processing unit (CPU) of a computer system. The CPU continuously reads instructions stored in the main memory and executes them as required. Any data actively operated on is also stored in the main memory. The main memory may be implemented using dynamic random access memory (DRAM).

Dynamic allocation/deallocation of portions of the main memory is, as understood here, reserving portions of main memory moment to moment, as needed, without having to reserve a fixed amount ahead of time. Each of the reserved portions is unique and does not overlap any other of the reserved portions. Executable codes may perform dynamic memory allocation for their own use during their execution, i.e. a portion of the main memory may be dynamically allocated for the execution of the executable code upon a dynamic memory allocation request of the executable code and said portion may be deallocated/released upon a respective dynamic memory deallocation request of said executable code.

A computer-implemented technology for detecting memory leaks in a dynamically memory allocated portions of a main memory of a computer system during execution of an executable code on the computer system is described herein. The executable code comprises dynamic memory allocation requests and dynamic memory deallocation requests. As it will be clearly seen from the description hereon this technology can not only detect memory leaks during execution of an executable code, but identify fragments of the executable code which have caused the memory leaks. Of particular significance of this computer-implemented technology is a functionality that enables mapping of the identified fragments of the executable code to the corresponding source code. Using this mapping developers can correct the source code and generate a new executable code which cases less memory leaks. The problem of memory leak detection in the source code is of particular importance for programming languages like C/C++, which have dynamic memory allocation and dynamic memory deallocation functionalities.

It is an objective of embodiments of the invention to provide for an computer system configured to detect memory leaks caused by execution of an executable code on the computer system, to identify fragments of the executable code, which execution has caused the memory leaks, a computer-implemented method to perform the same, and a computer readable medium having stored thereon a computer executable code for execution by a computer processor controlling the computer system, wherein execution of the instructions of the executable code cause the computer processor to execute said computer-implemented method. Advantageous embodiments are described in the dependent claims.

According to one embodiment, the present invention relates to a computer-implemented method for detecting a memory leak in dynamically allocated portions of a main memory of a computer system. The computer system comprises the main memory and a computer processor. The computer-implemented method comprises the following: starting executing an executable code by the computer processor; repetitively executing at least a portion of the executable code, the least a portion of the executable code comprising dynamic memory allocation requests and dynamic memory deallocation requests, wherein a repetition number of the repetitive executions is an integer value greater than one; in response to execution of each of the dynamic memory allocation requests of the at least a portion of the executable code generating a record, each of the records comprising a unique memory identification of a unique portion of the main memory dynamically allocated upon the execution of the each of the dynamic memory allocation request and a unique code identification of a fragment of the executable code and/or of a fragment of a source code corresponding to the fragment of the executable code, wherein the executable code is generated from the source code, wherein execution of the fragment of the executable code causes the execution of the each of the dynamic memory allocation request, wherein each of the unique memory identifications comprises a memory size of the respective unique portion of the main memory, wherein each of the unique memory identifications further comprises a memory address of the respective unique portion of the main memory; in response to execution of each of the dynamic memory deallocation requests of the at least a portion of the executable code deleting one of the records if the one of the records comprises the unique memory identification as specified in the each of the dynamic memory deallocation requests; after completion of the repetitive executing, counting numbers of the records in each of groups of the records, wherein each of the groups consists of the records having the identical unique code identifications and the identical memory sizes; selecting the groups having the numbers of the records being equal either to the repetition number or to the repetition number multiplied by any integer number greater than one; and identifying the fragment of the executable code having unique code identification stored in the record of one of the selected groups as a fragment of the executable code which execution causes the memory leak and/or identifying the fragment of the source code having unique code identification stored in the record of the one of the selected groups as a fragment of the source code having the respective fragment of the executable code which execution causes the memory leak.

The primary advantage of this computer-implemented method is a functionality enabling detecting memory leaks caused by execution of at least the portion of the executable code which comprises at least one dynamic memory allocation request, which does not cause the memory leaks, and at least one dynamic memory allocation request, which causes the memory leak. If the executable code is prepared in a correct way, repetitive execution of any portion of it does not cause respective repetitive erroneous dynamic memory allocation requests, which allocate portions of memory and do not release said portions of memory when they are no longer needed.

Another embodiment of the present invention relates to a computer system comprising a main memory and a computer processor. The computer processor is configured perform the following: starting executing an executable code by the computer processor; repetitively executing at least a portion of the executable code, the least a portion of the executable code comprising dynamic memory allocation requests and dynamic memory deallocation requests, wherein a repetition number of the repetitive executions is an integer value greater than one; in response to execution of each of the dynamic memory allocation requests of the at least a portion of the executable code generating a record, each of the records comprising a unique memory identification of a unique portion of the main memory dynamically allocated upon the execution of the each of the dynamic memory allocation request and a unique code identification of a fragment of the executable code and/or of a fragment of a source code corresponding to the fragment of the executable code, wherein execution of the fragment of the executable code causes the execution of the each of the dynamic memory allocation requests, wherein the executable code is generated from the source code, wherein each of the unique memory identifications comprises a memory size of the respective unique portion of the main memory, wherein each of the unique memory identifications further comprises a memory address of the respective unique portion of the main memory; in response to execution of each of the dynamic memory deallocation requests of the at least a portion of the executable code deleting one of the records if the one of the records comprises the unique memory identification as specified in the each of the dynamic memory deallocation requests; after completion of the repetitive executing, counting numbers of the records in each of groups of the records, wherein each of the groups consists of the records having the identical unique code identifications and the identical memory sizes; selecting the groups having the numbers of the records being equal either to the repetition number or to the repetition number multiplied by any integer number greater than one; and identifying the fragment of the executable code having unique code identification stored in the record of one of the selected groups as a fragment of the executable code which execution causes the memory leak and/or identifying the fragment of the source code having unique code identification stored in the record of the one of the selected groups as a fragment of the source code having the respective fragment of the executable code which execution causes the memory leak.

Another embodiment of the present invention refers to a computer readable medium having stored thereon a computer executable code for execution by a computer processor controlling a computer system comprising a main memory, wherein execution of the instructions of the executable code causes the computer processor to execute the following computer-implemented method: starting executing an executable code by the computer processor; repetitively executing at least a portion of the executable code, the least a portion of the executable code comprising dynamic memory allocation requests and dynamic memory deallocation requests, wherein a repetition number of the repetitive executions is an integer value greater than one; in response to execution of each of the dynamic memory allocation requests of the at least a portion of the executable code generating a record, each of the records comprising a unique memory identification of a unique portion of the main memory dynamically allocated upon the execution of the each of the dynamic memory allocation request and a unique code identification of a fragment of the executable code and/or of a fragment of a source code corresponding to the fragment of the executable code, wherein execution of the fragment of the executable code causes the execution of the each of the dynamic memory allocation requests, wherein the executable code is generated from the source code, wherein each of the unique memory identifications comprises a memory size of the respective unique portion of the main memory, wherein each of the unique memory identifications further comprises a memory address of the respective unique portion of the main memory; in response to execution of each of the dynamic memory deallocation requests of the at least a portion of the executable code deleting one of the records if the one of the records comprises the unique memory identification as specified in the each of the dynamic memory deallocation requests; after completion of the repetitive executing, counting numbers of the records in each of groups of the records, wherein each of the groups consists of the records having the identical unique code identifications and the identical memory sizes; selecting the groups having the numbers of the records being equal either to the repetition number or to the repetition number multiplied by any integer number greater than one; and identifying the fragment of the executable code having unique code identification stored in the record of one of the selected groups as a fragment of the executable code which execution causes the memory leak and/or identifying the fragment of the source code having unique code identification stored in the record of the one of the selected groups as a fragment of the source code having the respective fragment of the executable code which execution causes the memory leak.

According to another embodiment the source code comprises call commands, each of the call commands has a unique respective executable call command of the executable code, each of the dynamic memory allocation requests has a respective unique dynamic memory allocation command of the source code, execution of each of the executable call commands causes execution of a fragment of the executable code specified in the each of the executable call commands, wherein the execution of each of the executable call commands causes interruption of a sequentially ordered execution of the executable code and after execution of the respective portion of the executable code the sequentially ordered execution of the executable code is resumed, each of some of the fragments of the executable code specified in their respective call requests comprises one or more of the dynamic memory allocation requests, each of some the fragments of the executable code specified in their respective call requests comprises at least one of the call requests, wherein each of the call commands has a respective unique line identification in the source code, wherein each of the dynamic memory allocation commands has a respective unique line identification in the source code, wherein each of the unique code identifications comprises the unique line identification of the dynamic memory allocation command having the respective dynamic memory allocation request which execution has caused the generation of the record comprising the each of the unique code identifications, wherein each of the unique code identifications further comprises all unique line identifications of the call commands having their respective executable call commands which have caused execution of their respective portions of the executable code being partially executed during execution of the respective dynamic memory allocation request which execution has caused the generation of the record comprising the each of the unique code identifications.

This embodiment discloses a mapping mechanism for detecting portions of the source code, which corresponding fragments of the executable code when executed cause memory leaks. The source code comprises as usual a main code module (e.g. main.cpp in C/C++) and number of the secondary code modules (e.g. subroutines, functions, etc). A fragment of executable code corresponding to the main code module may cause execution of one or more other fragments of the executable code corresponding of the respective fragments of one or more secondary code modules. For instance, the primary code module may comprise a call of a function or a subroutine in one of the secondary code modules. Further, a subroutine of one of the secondary code modules may comprise fragments of the source code, which call execution of the same or another subroutine. Tracing of entire chain of fragments of the source code having corresponding of the executable code, which execution has caused the memory leak is very important for a developer/programmer. A particular implementation depends on a programming language environment. For instance, when C/C++ programming language is used, calling of each function or subroutine comprises "call stack" procedure. Registering of parameters of "call stack" procedures, such as dynamic memory allocation parameters, a name of the function/subroutine which was called, a name of the respective function/subroutine which has generated the respective call, etc. may provide sufficient information for tracing of entire chain mentioned above. Further details regarding implementation of this tracing are described in the next following embodiments.

According to another embodiment the source code is split in code modules, wherein each of the code modules has a unique name identification, wherein each of the call commands has a respective unique line number in the respective code module comprising the each of the call commands, wherein the unique line identification of each of the call commands comprises the respective unique line number of the each of the call commands and the unique name identification of the respective code module comprising the each of the call commands, wherein each of the dynamic memory allocation commands has a respective unique line number in the respective code module comprising the each of the dynamic memory allocation commands, wherein the unique line identification of each of the dynamic memory allocation commands comprises the respective unique line number of the each of the dynamic memory allocation commands and the unique name identification of the respective code module comprising the each of the dynamic memory allocation commands.

According to another embodiment, the generating of the records and the deleting of the records is executed only during the repetitive execution.

According to another embodiment, the executing of the executable code is executed in a software environment configured in a multilayered software architecture comprising an application software layer, a leak detection software layer, and an operating system software layer, the executing of the executable code is performed in the application software layer, the leak detection software layer is allocated in between the application software layer and the operating system software layer, the leak detection software layer is configured to perform the generating of the respective record upon execution of each of the dynamic memory allocation request and to perform the deleting the record to be deleted upon execution of the respective dynamic memory deallocation request.

The functioning of the leak detection software layer may be based on hooking techniques, which are used to alter or augment the behavior of an operating system, of applications, or of other software components by intercepting function calls or messages or events passed between software components and/or software layers.

According to another embodiment the repetitive executing of the at least of the portion of the executable code is performed in a software driven test mode by a test software operating in the application software layer.

BRIEF DESCRIPTION OF THE DRAWINGS

FIG. 8 is a set of tables illustrating execution of an executable code corresponding to the example source code.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1:
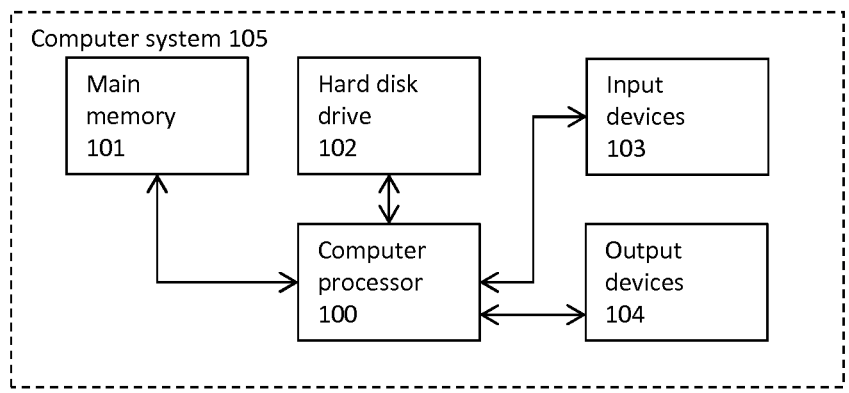
FIG. 1 is a block diagram of a computer system.

FIG. 1 illustrates a block diagram of an example computer system 105, which may be used for a computer-implemented method of a detecting a memory leak. The computer system 105 comprises a main memory 101, a hard disk drive 102, a computer processor 100, one or more input devices 103, and one or more output devices 104. The computer processor is communicatively coupled with devices mentioned above. The communicative coupling may be performed via one or more data busses. The computer processor is configured to perform a computer-implemented method for detecting a memory leak in dynamically allocated portions of the main memory 101. Input and output devices are configured to support user interface functions, such as displaying to a user information generated by the computer system and receiving various information form the user, such a commands, text, etc. The main memory is used for storing at least a portion of the executable code comprising dynamic memory allocation requests and dynamic memory deallocation requests. The computer processor is further configured to allocate unique portions of the main memory upon execution of each of the dynamic memory allocation requests and of the dynamic memory deallocation requests. Hard disk may be configured to store the executable code and a source code used for generation of said executable code.

The source code may be split in source code modules. An example source depicted on the FIG. 2 has two code modules 302 and 303. Each source code module has a unique respective identification name 301. Some or all of each lines of the source code module have a respective unique line identification in the source code. Some or all of each of the lines of the source code has a unique respective line number 301 in the respective source code comprising the each of the lines. The unique line identification of the line of the source code may comprise the unique name identification of the source code module comprising said line and the unique line number of said line in said source code module. For instance the unique line identification of a line "if(!ptr1)" in the example source code comprises the name of the source module "Subroutine.cpp" and the line number "90." Each dynamic memory allocation request of the executable code has a respective dynamic memory allocation command in the source code. Each dynamic memory deallocation request of the executable code has a respective dynamic memory deallocation command in the source code. Each of some or all of the code modules may comprise subroutines, functions, etc. Some or all of the each code modules comprise one or more call commands. Some or all of the each code modules comprise one or more of the dynamic memory allocation commands. Some or all of the each code modules comprise one or more of the dynamic memory deallocation commands. Each of the call commands in the source code has a respective executable code command in the executable code. Execution of each of the executable call commands causes execution of a fragment of the executable code specified in the each of the executable call commands, wherein the execution of each of the executable call commands causes interruption of a sequentially ordered execution of the executable code and after execution of the respective portion of the executable code the sequentially ordered execution of the executable code is resumed. The fragment of the executable code specified in the executable call command may correspond to a function or subroutine in the source code, wherein the respective call command of the source code may be allocated within another subroutine or another function. The sequentially ordered execution of executable code and subsequent resuming of the sequential execution of the executable code is as usual performed by executing CallStack operations which generate stack data structures needed for the resuming the sequential execution of the executable code form the point where its sequential execution was interrupted. Further CallStack operations store information in the stack data structures regarding all fragments of the executable code specified in their respective executable call commands which execution is started but not is completed yet. For instance these fragments of the executable code may be active subroutines and functions of the executable code, which execution is started and not yet completed yet. This kind of stack data structures is also known as an execution stack, control stack, run-time stack, or machine stack.

Branching of execution of the executable code is quite complex, because each of some or all of the fragments of the executable code specified in their respective call requests comprises one or more of the dynamic memory allocation requests, and each of some or all the fragments of the executable code specified in their respective call requests comprises at least one of the call requests. Thus providing to a code developer or a programmer complete information regarding all active subroutines, functions, etc. of the executable code which were active when the dynamic memory allocation request causing the memory leak was executed is very important. This may be done by evaluating the stack data structures and as a result thereof by identifying all executable call functions and portions of the executable code specified in them which execution was partially completed when the dynamic memory allocation request causing the memory leak was executed. This information can be easily mapped to the respective lines of the source code. For instance when the aforementioned approach is applied to the example code depicted on the FIG. 2 the developer will get the following information: line 300 in subroutine.cpp and line 50 in main.cpp. The details regarding identifying the dynamic memory allocation request of an executable code corresponding to the dynamic memory allocation command "ptr3=allocatememory(400)" as the command of the executable code which execution causes the memory leak will be described in the text further on.

Figure 2:
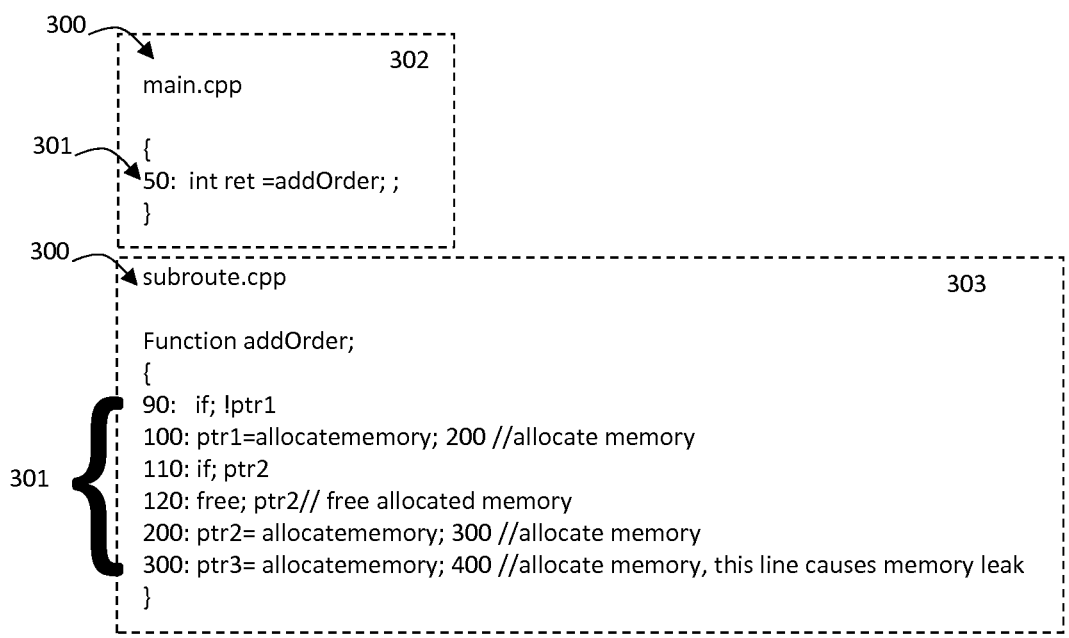
FIG. 2 is an example source code.

FIG. 2 illustrates a software environment configured in a multilayered software architecture comprising at least an application software layer, a leak detection software layer, and an operating system software layer. If the primary and secondary code modules are written in C/C++ language the operating system software layer may be a C Run Time Library. The executing of the executable code is performed in the application software layer. The leak detection software layer is allocated in between the application software layer and the operating system software layer, the leak detection software layer is configured to perform the generating of the respective record upon execution of each of the dynamic memory allocation request and to perform the deleting the record to be deleted upon execution of the respective dynamic memory deallocation request. Each of the records comprise a unique memory identification of a unique portion of the main memory dynamically allocated upon the execution of the each of the dynamic memory allocation request and a unique code identification of a fragment of the executable code which causes the execution of the each of the dynamic memory allocation request and/or of a fragment of a source code corresponding to the fragment of the executable code. The unique code identification of the fragment of the source code may be implemented as described above. Each of the unique memory identifications may comprise a memory size of the respective unique portion of the dynamic memory and a memory address of the respective unique portion of the main memory. The memory size may be specified in bytes or number of words in the memory. The memory address may be a first address of the respective unique portion of the main memory. The memory address may be further a virtual address in the memory.

Application software layer coordinates execution of one or more executable codes. It forwards (macro) commands/requests generated by the one or more executable codes to the operating system software layer via optional infrastructure software layer and manages data traffic needed for execution of the one or more executable codes. A test software may operate in the application layer. The test software manages execution of the executable code and detection of memory leaks generated during execution of the executable code. For instance the test software may cause a repetitive execution of at least a portion of the executable code in the software driven test mode. The repetitive execution may be performed by a repetitive calling of the same function of the executable code by the test software (e.g. performing the same transaction, the same update/modification of data processed by the executable code, etc.). Alternatively or in addition to this the test software may cause repetitive execution of entire executable code or one or more preselected portions of the executable code. The test software may further activate/deactivate the leak detection software layer when necessary. For instance, the leak detection software layer may be activated only when the repetitive execution of at least a portion of the executable code is performed. A test schedule/scenario of searching for of the portions of the executable code causing the memory leaks performed by the test software may be specified by user.

The multilayered software architecture may comprise further an infrastructure software layer allocated in-between the application software layer and the leak detection software layer. The infrastructure layer performs logging networking, and other services which are required for supporting the application software layer. It may convert macro commands/requests received from the application layer into commands/requests executable by the operating system software layer.

Functioning of the leak detection software layer may be based on hooking techniques, which are used to alter or augment the behavior of an operating system, of applications, of executable codes, or of other software components by intercepting function calls or messages or events passed between software components and/or software layers.

The operating system software layer provides functioning of the computer system during execution of the one or more executable codes and test software and execution of the one or more executable codes, the test software, and other software components operating on the computer system.

Figure 3:
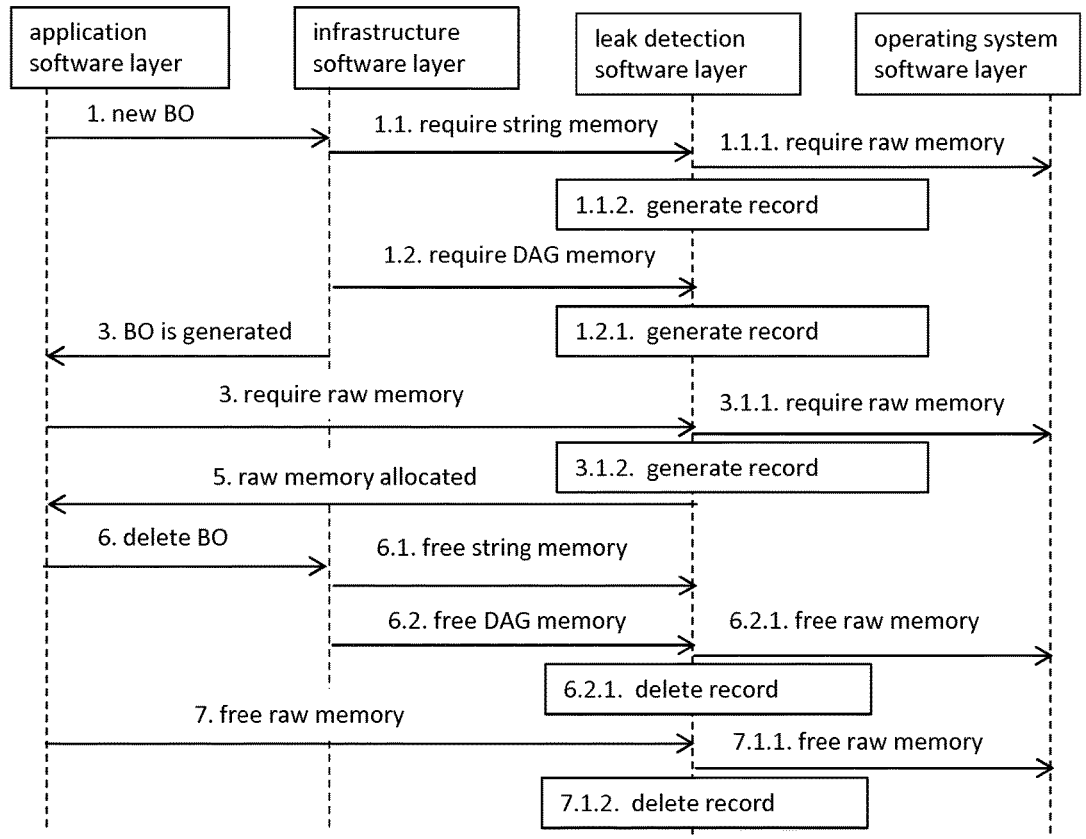
FIG. 3 is a diagram of a software environment configured in multilayered software architecture.

Functioning of the software environment depicted on the FIG. 3 may be illustrated on the following example. At first the executable code initiates generation of a new business object (BO). The application software layer sends a respective request for creating of the new BO (1. New BO) to the infrastructure software layer. Afterwards the infrastructure software layer generates a request for string memory addressed to the operating system software layer (1.1 require string memory). In accordance with the functionalities of leak detection software described above the leak detection software layer sends a request for raw memory allocation (1.1.1. require raw allocation) and generates a record (1.1.2. generate record). The content of this generated record and all other records further generated in the description of this example is described above. The request of raw memory is an allocation of a unique portion of the memory 101 of the computer system 105 for the BO. After the generating of said record the infrastructure software layer sends another request for allocating of Data Access Gate (DAG) memory within the previously allocated raw memory (1.2. DAG memory). When the DAG memory is allocated the leak detection software layer generates another recoded related to the DAG memory allocation (1.2.1. generate record). Afterwards the infrastructure layer sends information regarding generated BO (3. BO allocated). The information comprises memory addresses and memory volumes of the allocated portions of the memory.

Additional raw memory may be required during life time of the generated BO. In this case the application layer sends a request for allocation of additional raw memory addressed directly to the operating system software layer (3. require raw memory) upon receiving if the respective request from the executable code. In accordance with the functionalities of the leak detection software layer the leak detection tool forwards this request to the operating system software layer (3.1.1. require raw memory), generates the respective record related to the allocation of the additional raw memory (3.1.2. generate record), and sends a confirmation to the application software layer (5. raw memory allocated).

When the executable code comprises the command to delete the generated BO and this command is executed, the application software generates a request to delete the generated BO addressed to the infrastructure software layer (6. delete BO). In response to this request the infrastructure layer generates corresponding request to free the string memory (6.1) and to free the DAG memory (6.2.). When the leak detection software layer receives the requests 6.1 and 6.2 is sends request to free the raw memory allocated in the step 1.1.1. and deletes the respective records in step 6.2.1. "delete record", wherein the respective records are generated in the steps 1.1.2 and 1.2.1. When the BO is deleted the previously allocated additional raw memory is deleted. When the application layer receives a respective request to delete the BO, it sends a request to free the allocated raw memory directly addressed to the operating system software layer (7. Free raw memory), wherein the allocated memory to be freed is allocated in the previous step 3.1.1. In accordance with the functionalities of the leak detection software layer the leak detection tool forwards this request to the operating system software layer (7.1.1. free raw memory) and deletes the respective record (7.1.2. delete record), which was generated in the step 3.1.2.

Figure 4:
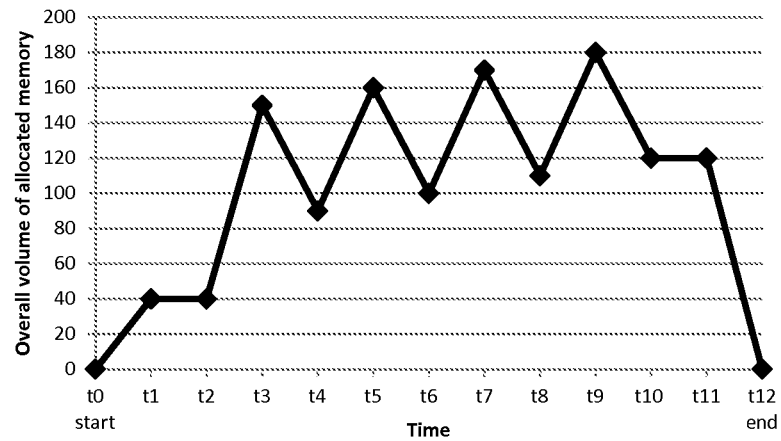
FIG. 4 is a graph of overall volume of allocated memory versus time.
Figure 5:
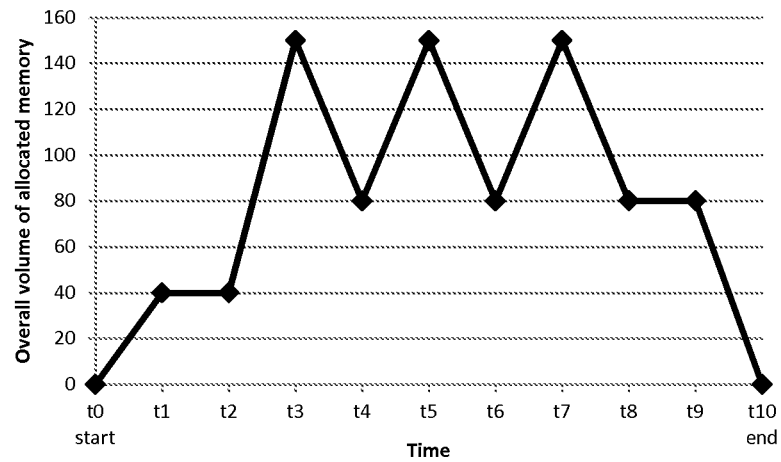
FIG. 5 is a graph of overall volume of allocated memory versus time.
Figure 6:
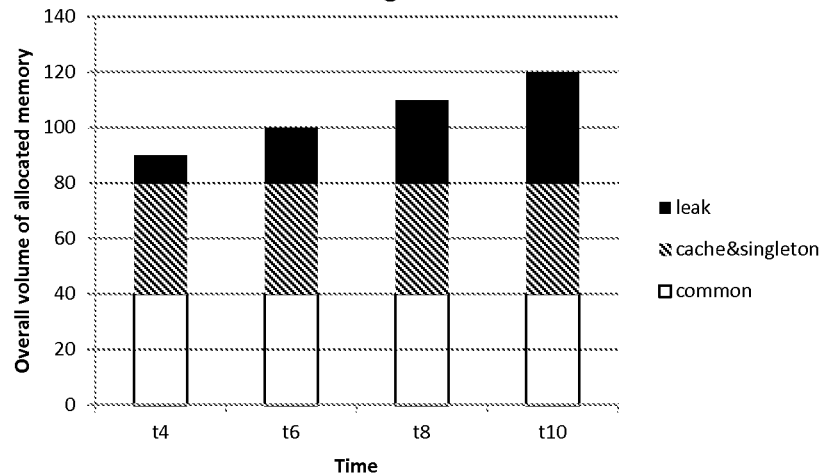
FIG. 6 is a stacked histogram of a breakdown of a memory allocation versus time.

FIGS. 4-6 illustrate issues related to identification of the memory leaks in greater detail. FIG. 4 illustrates an overall volume of allocated memory for execution of a first executable code which execution causes memory leaks. The execution of the first executable code starts at time t0 and ends at time t12. FIG. 4 illustrates an overall volume of allocated memory for execution of second executable code which execution does not cause memory leaks. The execution of the second executable starts at time t0 and ends at time t12. As it can be clearly seen from the FIGS. 4 and 5 the time evolution of these graphs does not provide sufficient information for differentiating between the first and the second executable code and drawing a conclusion that the execution of the first executable code causes the memory leaks. The volume of allocated memory equals to zero when execution of the first and the second executable codes is ended, despite the fact that the execution of the first executable code does cause the memory leaks, i.e. not all allocated memory is freed by respective portions of the first executable code. The release of the not released memory which was allocated for the execution of the first executable code may be performed automatically by dedicated functions of the operating system, special memory garbage collection software, etc. when the execution of the first executable code is finished.

Memory allocation for execution of the executable codes serves many purposes. The execution of the executable code may require a one-time scratchpad, allocated once and never de-allocated for the duration of the program execution. The execution of the executable code may further require a creation of an in-memory structure, like a binary tree, that is used throughout the program. Execution of the operations of the executable code like the lazy load, cache and singleton may require allocation of the memory that is not released until the execution of the executable code is completed. This portion of allocated memory is marked as "cache&singleton" on FIG. 6 illustrating a stacked histogram of a breakdown of a memory allocation versus time during execution of the first executable code. At it clearly seen from the FIG. 6 this portion of allocated memory remains constant when the time value is equal to t4, t6, t8, and t10.

The portion of the allocated memory called "common" on the stacked diagram (FIG. 6) illustrates another example of the allocated memory that is required for the execution of the first executable code, which is released when the execution of the executable code is completed. This portion of allocated memory may serve a purpose of processing of a recurring event or service that the first executable code performs during its execution.

The portion of allocated memory called "leak" on the stack diagram (FIG. 6) corresponds to the memory leaks caused by execution of the first executable code. This portion of memory would have been released at t4, t6, t8, t10 if the execution of first executable code did not cause the memory leaks. In the other words, if the first executable code would have been free of errors causing the memory leaks the portion of the allocated memory called "leak" would not be present in the stack diagram (FIG. 5). Thus there is a need for an effective procedure enabling differentiation between allocations of memory corresponding to the memory leaks and other allocations of memory.

Figure 7:
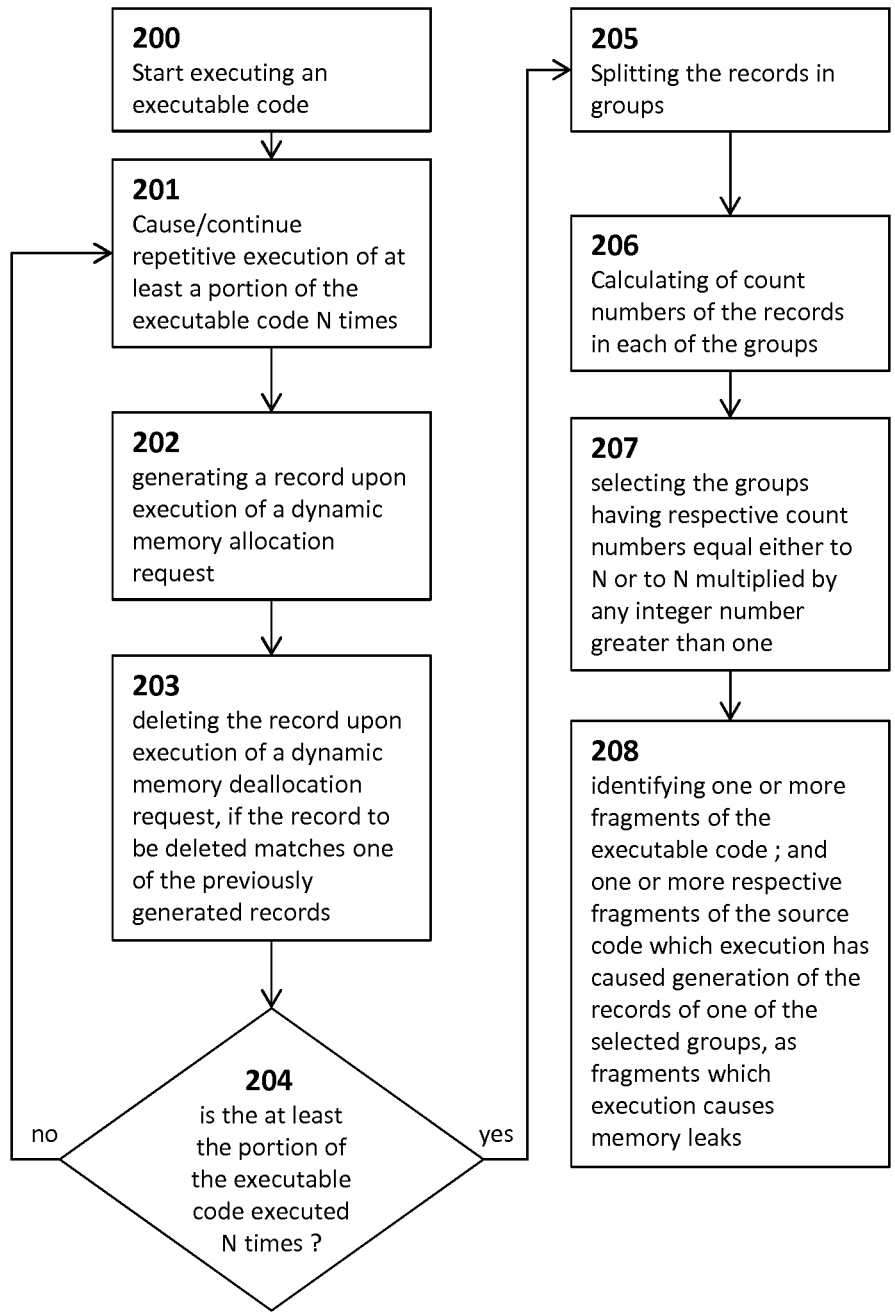
FIG. 7 is a flow chart of a method for detecting a memory leak.

FIG. 7 illustrates a flow diagram of a method for automated memory leak detection during execution of the executable code. The executable code may be executed on the computer system 105 which is described above.

Merely for explanatory purposes the execution of the method depicted on the FIG. 7 is illustrated on an example of detecting the memory leaks caused by execution of an executable code which is generated using the example source code depicted on the FIG. 2. The example code comprises to source code modules "main.cpp" and "subroutine.cpp".

The method begins with a process block 200, wherein executing the executable code by a computer processor is started. Afterwards a repetitive execution of at least a portion of the executable code is started in a process block 201. The least the portion of the executable code comprises dynamic memory allocation requests and dynamic memory deallocation requests. A repetition number of the repetitive executions is an integer value greater than one. The repetitive execution may be operated by the test software described above.

The at least the portion of the executable code may be the executable code corresponding to the example source code mentioned above.

A process block 202 is executed at least once during the repetitive execution. In the process block 202 a record upon execution of each of the dynamic memory allocation request is executed. Each of the records comprises a unique memory identification of a unique portion of the main memory dynamically allocated upon the execution of the each of the dynamic memory allocation request and a unique code identification of a fragment of the executable code which causes the execution of the each of the dynamic memory allocation request and/or of a fragment of a source code corresponding to the fragment of the executable code, wherein the executable code is generated from the source code. Each of the unique memory identifications may comprise a memory size of the respective unique portion of the main memory. Each of the unique memory identifications may further comprise a memory address of the respective unique portion of the main memory. Details of contents of the records are described above.

A process block 203 is executed at least once during the repetitive execution. In the process block 203 the record upon execution of the dynamic memory deallocation is deleted if the record to be deleted comprises the unique memory identification as specified in said dynamic memory deallocation request.

A decision process block 204 causes the repetitive execution of the at least the portion of the executable code, wherein the number the repetitive executions of the at least the portion of the executable code equals to the integer number greater than one. It is necessary to mention that in order to prevent corruption of the results (i.e. a set of records generated by execution of the process blocks 202 and 203) no other software tools are allowed to change memory allocations generated by the at least the portion of the executable code during its repetitive execution.

Turning back to the example source code the execution of the process blocks 201-203 and the decision process block 204 during triple execution the executable code corresponding to the example source code results in the following, wherein no changes in allocation of memory which was allocated as a result of the execution of the executable code is performed between the consecutive executions of the executable code. The first execution of the executable code results in generation of Table 1 depicted on the FIG. 8. Execution of the fragment of the executable code corresponding to a line 50 in the main.cpp causes execution of the fragment of the executable code corresponding to the subroutine.cpp. Since a pointer ptr1 is not generated yet, execution of the fragment of the executable code corresponding to lines 90 and 100 in the subroutine.cpp causes allocation of 200 bytes in the memory. This procedure is registered in a record 1 of the Table 1. This record comprises the request number equal to 1, an allocated memory size of 200 bytes, an address of the allocated memory 0x0000000000378ec, a unique name identification of the subroutine module "subroutine.cpp" and a unique line number identification 100 of a dynamic memory allocation command "ptr1=allocatememory(200)", a unique name identification of the main.cpp module "main.cpp" and a unique line number identification 50 of a call command "int ret=addOrder( )", which calls the subroutine "subroutine.cpp". As it is mentioned above the lines of the source code of the first record may be identified by monitoring execution of their respective callstack operations of the executable code.

The execution of a fragment of the executable code corresponding to line 110 will not cause execution of a fragment of the executable code corresponding to line 120 because a pointer ptr2 is not generated yet.

Execution of the fragments of the executable code corresponding to the lines 200 and 300 causes generation of records 2 and 3 in a similar way as generation of the record 1.

Subsequent execution of the executable code corresponding to example source code times results in generation of Table 2 depicted on the FIG. 8. Execution of the fragment of the executable code corresponding to the line 90 prevents further allocation of unique portions of memory of 200 bytes. Therefore the record 1 is not multiplied in the table 2. The record 2 is deleted during the second execution and afterwards the record with the identical content except the memory address is generated during the second execution. The same occurs during the third execution and as a result thereof the record 6 is generated. Since the execution of the fragment of the executable code corresponding to line 300 causes memory leaks the table 2 comprises 3 respective records 3, 5, and 7.

When the repetitive execution is completed, the decision process block 204 causes stop of the generation and the deletion of the records and execution of a process block 205. This may be performed by deactivating of the operation of the leak detection memory layer. It is needed for prevention of corruption of the generated records. The corruption may be caused by further execution of the executable code.

Alternatively the generation and deletion of the records may be further continued after the execution of the decision process block 204, i.e. there is no need to stop the deleting and generating of the records when the repetitive execution is completed if the records generated during the repetitive execution are saved as a separate partition.

In the process block 205 the records generated during the repetitive execution are split in groups, wherein each of the groups consists of the records having the identical unique code identifications and the identical memory sizes.

A process block 206 is executed after the process block 205. In the process block 206 numbers of the records in each of the groups of the records are counted.

Turning back to the aforementioned example source code the execution of the process blocks 205 and 206 results in generation of the table 3 depicted on the FIG. 8. The first group corresponds to the record 1 in the Table 2 and has the count number equal to 1, because no other record other than record 1 has the same the same unique code identification and the same memory size as specified in the record 1. The second group corresponds to the record 6 in the Table 2 and has the count number equal to 1, because no other record other than record 6 has the same unique code identification and the same memory size as specified in the record 6. The third group corresponds to the records 3, 4, and 7 in the Table 2 and has the count number equal to 3, because the records 3, 4, and 7 have the identical unique code identification and the identical memory size.

In a process block 207 the groups having the numbers of the records being equal either to the repetition number or to the repetition number multiplied by any integer number greater than one are selected. The criterion wherein the repetition number is multiplied by any integer number greater than is needed because the repetitive execution of the fragment of the executable code causing the memory leak may be multiplied by internal repetitive execution within the at least the portion of the executable code.

Turning back to the aforementioned example the execution of the process block 207 results in selection of the third group in the third table depicted on the FIG. 8, because a count number of this group equals to the repetition number.

In a process block 208 the fragment of the executable code having unique code identification stored in the record of one of the selected groups is identified as a fragment of the executable code which execution causes the memory leak and/or the fragment of the source code having unique code identification stored in the record of the one of the selected groups is identified as a fragment of the source code having the respective fragment of the executable code which execution causes the memory leak.

Turning back to the aforementioned example the execution of the process block 208 results in identification of the line 50 in the main.cpp and the line 300 in the subroutine.cpp, which corresponding fragments of the executable code cause the memory leak when executed.

The invention claimed is:

1. A computer-implemented method for detecting a memory leak in dynamically allocated portions of a main memory of a computer system, the computer system comprising the main memory and a computer processor and having a multilayer software architecture comprising an application software layer, an infrastructure software layer, a leak detection layer and an operating system software layer, the computer-implemented method comprising:

generating an executable code from a source code;

activating the leak detection layer of the multilayer software architecture, where the leak detection software layer is allocated between the infrastructure software layer and the operating system software layer, wherein the infrastructure software layer is allocated between the application software layer and the leak detection software layer;

executing test software by the computer processor, wherein the test software causes repetitive execution of at least a portion of the executable code in the application software layer of the multilayer software architecture, the at least a portion of the executable code comprising dynamic memory allocation requests and dynamic memory deallocation requests, wherein a repetition number of the repetitive executions is a integer value greater than one, wherein the infrastructure software layer converts requests generated in the application software layer into requests executable by the operating software layer;

in response to execution of each of the dynamic memory allocation requests of the at least a portion of the executable code:

receiving the dynamic memory allocation request at the leak detection layer of the computer system;

the leak detection layer generating a record, each of the records comprising a unique memory identification of a unique portion of the main memory dynamically allocated upon the execution of the each of the dynamic memory allocation requests and a unique line number of a fragment of the source code corresponding to a fragment of the executable code that execution causes the execution of the each of the dynamic memory allocation requests, wherein the executable code is generated from the source code, wherein each of the unique memory identifications comprises a memory size of the respective unique portion of the main memory, wherein each of the unique memory identifications further comprises a memory address of the respective unique portion of the main memory; and the leak detection layer passing the dynamic memory allocation request to the operating system software layer of the multilayer software architecture;

in response to execution of each of the dynamic memory deallocation requests of the at least a portion of the executable code;

receiving the dynamic memory deallocation request at the leak detection layer of the computer system;

the leak detection layer deleting one of the records if the one of the records comprises the unique memory identification as specified in the each of the dynamic memory deallocation requests; and the leak detection layer passing the dynamic memory deallocation request to the operating system software layer of the multilayer software architecture;

after completion of the repetitive executing, counting numbers of the records in each of groups of the records, wherein each of the groups consists of the records having the identical unique line number identification and the identical memory sizes;

selecting, by the computer system, the groups having the numbers of the records being equal either to the repetition number or to the repetition number multiplied by any integer number greater than one; and identifying, by the computer system, the fragment of the source code having the unique line number stored in the record of the one of the selected groups as a fragment of the source code having the respective fragment of the executable code which execution causes the memory leak, wherein dynamic memory allocation and deallocation requests of executing software are passed directly from the application software to the operating system software layer when the leak detection layer is not activated.

2. The computer-implemented method of claim 1, wherein the source code comprises call commands, each of the call commands has a unique respective executable call command of the executable code, each of the dynamic memory allocation requests has a respective unique dynamic memory allocation command of the source code, execution of each of the executable call commands causes execution of a fragment of the executable code specified in the each of the executable call commands, wherein the execution of each of the executable call commands causes interruption of a sequentially ordered execution of the executable code and after execution of the respective portion of the executable code the sequentially ordered execution of the executable code is resumed, each of some of the fragments of the executable code specified in their respective call requests comprises one or more of the dynamic memory allocation requests, each of some of the fragments of the executable code specified in their respective call requests comprises at least one of the call requests, wherein each of the call commands has a respective unique line identification in the source code, wherein each of the dynamic memory allocation commands has a respective unique line identification in the source code, wherein each of the unique code identifications comprises the unique line identification of the dynamic memory allocation command having the respective dynamic memory allocation request which execution has caused the generation of the record comprising the each of the unique code identifications, wherein each of the unique code identifications further comprises all unique line identifications of the call commands having their respective executable call commands which have caused execution of their respective portions of the executable code being partially executed during execution of the respective dynamic memory allocation request which execution has caused the generation of the record comprising the each of the unique code identifications.

3. The computer-implemented method of claim 2, wherein the source code is split in code modules, wherein each of the code modules has a unique name identification, wherein each of the call commands has a respective unique line number in the respective code module comprising the each of the call commands, wherein the unique line identification of each of the call commands comprises the respective unique line number of the each of the call commands and the unique name identification of the respective code module comprising the each of the call commands, wherein each of the dynamic memory allocation commands has a respective unique line number in the respective code module comprising the each of the dynamic memory allocation commands, wherein the unique line identification of each of the dynamic memory allocation commands comprises the respective unique line number of the each of the dynamic memory allocation commands and the unique name identification of the respective code module comprising the each of the dynamic memory allocation commands.

4. The computer-implemented method of claim 3, wherein the generating of the records and the deleting of the records is executed only when the leak detection layer is activated and wherein the leak detection layer is only activated during the repetitive execution caused by the test software.

5. The computer-implemented method of claim 1, wherein the repetitive executing of the at least of the portion of the executable code is performed in a software driven test mode by the test software operating in the application software layer.

6. A computer system comprising a main memory and a computer processor, wherein the computer system provides a multilayered software architecture comprising an application software layer, a leak detection software layer, an infrastructure software layer, and an operating system software layer, and wherein the computer processor is configured to perform the following:

generating an executable code from a source code;

activating the leak detection layer of the multilayer software architecture, where the leak detection software layer is allocated between infrastructure software layer and the operating system software layer, wherein the infrastructure software layer is allocated between the application software layer and the leak detection software layer;

executing test software by the computer processor in the application software layer of the multilayer software architecture, wherein test software causes repetitive execution of at least a portion of the executable code, the least a portion of the executable code comprising dynamic memory allocation requests and dynamic memory deallocation requests, wherein a repetition number of the repetitive executions is an integer value greater than one, wherein the infrastructure software layer converts requests generated in the application software layer into requests executable by the operating software layer;

in response to execution of each of the dynamic memory allocation requests of the at least a portion of the executable code:

receiving the dynamic memory allocation request at the leak detection layer;

the leak detection layer generating a record, each of the records comprising a unique memory identification of a unique portion of the main memory dynamically allocated upon the execution of the each of the dynamic memory allocation request and a unique line number of a fragment of the source code corresponding to a fragment of the executable code that execution causes the execution of the each of the dynamic memory allocation requests, wherein the executable code is generated from the source code, wherein each of the unique memory identifications comprises a memory size of the respective unique portion of the main memory, wherein each of the unique memory identifications further comprises a memory address of the respective unique portion of the main memory; and the leak detection layer passing the dynamic memory allocation request to the operating system software layer of the multilayer software architecture;

in response to execution of each of the dynamic memory deallocation requests of the at least a portion of the executable code:

receiving the dynamic memory deallocation request at the leak detection layer of the computer system;

the leak detection layer deleting one of the records if the one of the records comprises the unique memory identification as specified in the each of the dynamic memory deallocation requests; and the leak detection layer passing the dynamic memory deallocation request to the operating system software layer of the multilayer software architecture;

after completion of the repetitive executing, counting numbers of the records in each of groups of the records, wherein each of the groups consists of the records having the identical unique line numbers and the identical memory sizes;

selecting the groups having the numbers of the records being equal either to the repetition number or to the repetition number multiplied by any integer number greater than one; and identifying, by the computer system, the fragment of the source code having the unique line number stored in the record of the one of the selected groups as a fragment of the source code having the respective fragment of the executable code which execution causes the memory leak;

wherein dynamic memory allocation and deallocation requests of software executing in the application software layer are passed directly from the application software to operating system software layer when the leak detection layer is not activated.

7. The computer system of claim 6, wherein the source code comprises call commands, each of the call commands has a unique respective executable call command of the executable code, each of the dynamic memory allocation requests has a respective unique dynamic memory allocation command of the source code, execution of each of the executable call commands causes execution of a fragment of the executable code specified in the each of the executable call commands, wherein the execution of each of the executable call commands causes interruption of a sequentially ordered execution of the executable code and after execution of the respective portion of the executable code the sequentially ordered execution of the executable code is resumed, each of some of the fragments of the executable code specified in their respective call requests comprises one or more of the dynamic memory allocation requests, each of some the fragments of the executable code specified in their respective call requests comprises at least one of the call requests, wherein each of the call commands has a respective unique line identification in the source code, wherein each of the dynamic memory allocation commands has a respective unique line identification in the source code, wherein each of the unique code identifications comprises the unique line identification of the dynamic memory allocation command having the respective dynamic memory allocation request which execution has caused the generation of the record comprising the each of the unique code identifications, wherein each of the unique code identifications further comprises all unique line identifications of the call commands having their respective executable call commands which have caused execution of their respective portions of the executable code being partially executed during execution of the respective dynamic memory allocation request which execution has caused the generation of the record comprising the each of the unique code identifications.

8. The computer system of claim 7, wherein the source code is split in code modules, wherein each of the code modules has a unique name identification, wherein each of the call commands has a respective unique line number in the respective code module comprising the each of the call commands, wherein the unique line identification of each of the call commands comprises the respective unique line number of the each of the call commands and the unique name identification of the respective code module comprising the each of the call commands, wherein each of the dynamic memory allocation commands has a respective unique line number in the respective code module comprising the each of the dynamic memory allocation commands, wherein the unique line identification of each of the dynamic memory allocation commands comprises the respective unique line number of the each of the dynamic memory allocation commands and the unique name identification of the respective code module comprising the each of the dynamic memory allocation commands.

9. The computer system of claim 6, the generating of the records and the deleting of the records is executed only when the leak detection layer is activated and wherein the leak detection layer is only activated during the repetitive execution caused by the test software.

10. The computer system of claim 6, wherein the repetitive executing of the at least of the portion of the executable code is performed in a software driven test mode by the test software operating in the application software layer.

11. A non-transitory computer readable medium having stored thereon a computer executable code for execution by a computer processor controlling a computer system comprising a main memory, wherein execution of the instructions of the executable code causes the computer processor to execute a computer-implemented method of claim 1 on the computer system.

12. A non-transitory computer readable medium having stored thereon a computer executable code for execution by a computer processor controlling a computer system comprising a main memory, wherein execution of the instructions of the executable code causes the computer processor to execute a computer-implemented method of claim 2 on the computer system.

13. A non-transitory computer readable medium having stored thereon a computer executable code for execution by a computer processor controlling a computer system comprising a main memory, wherein execution of the instructions of the executable code causes the computer processor to execute a computer-implemented method of claim 3 on the computer system.

14. A non-transitory computer readable medium having stored thereon a computer executable code for execution by a computer processor controlling a computer system comprising a main memory, wherein execution of the instructions of the executable code causes the computer processor to execute a computer-implemented method of claim 4 on the computer system.

15. A non-transitory computer readable medium having stored thereon a computer executable code for execution by a computer processor controlling a computer system comprising a main memory, wherein execution of the instructions of the executable code causes the computer processor to execute a computer-implemented method of claim 5 on the computer system.

\* \* \* \* \*